United States Patent [19]
Belart

[11] 3,976,171
[45] Aug. 24, 1976

[54] DUAL-CIRCUIT BRAKE SYSTEM
[75] Inventor: Juan Belart, Walldorf, Germany
[73] Assignee: ITT Industries, Inc., New York, N.Y.
[22] Filed: Oct. 3, 1975
[21] Appl. No.: 619,413

[30] Foreign Application Priority Data
Nov. 8, 1974 Germany............................ 2452952

[52] U.S. Cl................................. 188/345; 60/552; 303/6 R; 303/52
[51] Int. Cl.².................... B60T 11/20; B60T 13/58
[58] Field of Search ....................... 188/345, 106 P; 303/6 R, 52; 60/548, 550, 552; 91/391 R

[56] References Cited
UNITED STATES PATENTS

| | | | |
|---|---|---|---|
| 3,572,850 | 3/1971 | Schultz............................. | 303/6 R |
| 3,639,008 | 2/1972 | MacDuff........................... | 303/10 |
| 3,683,619 | 8/1972 | Belart............................... | 60/552 |
| 3,692,367 | 9/1972 | Kurgmitsu......................... | 303/52 |
| 3,751,919 | 8/1973 | Ron.................................. | 91/391 R |
| 3,815,961 | 6/1974 | Belart et al. ...................... | 303/52 |
| 3,830,549 | 8/1974 | Kito et al. ......................... | 303/6 R |

FOREIGN PATENTS OR APPLICATIONS
2,045,803   3/1971   Germany............................ 188/345

Primary Examiner—Duane A. Reger
Assistant Examiner—Edward R. Kazenske
Attorney, Agent, or Firm—John T. O'Halloran; Peter C. Van Der Sluys; Alfred C. Hill

[57] ABSTRACT

The brake system includes a tandem master cylinder and a control valve for introducing pressure supplied from a power source. The main feature of the present invention is that the pressure from the power source is first introduced into annular chambers behind the sleeve seals of both the tandem master-cylinder pistons. This makes it possible for the pistons to travel only a small distance if power from the power source is available. Thus, the pistons can be dimensioned in accordance with the force the driver is able to exert with his foot in the event of failure of the power source.

11 Claims, 2 Drawing Figures

DUAL-CIRCUIT BRAKE SYSTEM

BACKGROUND OF THE INVENTION

This invention relates to a dual-circuit brake system which includes a master cylinder with two master-cylinder pistons the work chambers of which connect with one brake circuit each, which has coaxially to the master cylinder a pressure-control valve for introducing pressure supplied from a power source into the dual-circuit brake system, and which permits the master-cylinder pistons to be actuated by displacing a portion of the pressure-control valve if there is a failure of the power source. Such a dual-circuit brake system is known from the German unexamined published patent application DT-OS No. 2,045,803.

In this known dual-circuit brake system, depression of the brake pedal will cause pressure to be introduced from the pressure-control valve into a booster chamber. This pressure acts on an actuation surface of a master-cylinder piston, thereby displacing the latter and causing it to urge brake fluid out of its work chamber. The brake pressure which builds up will act on a second master-cylinder piston, thereby enabling the latter to similarly urge brake fluid out of its work chamber.

A disadvantage of the brake system of DT-OS No. 2,045,803 is that the volume available in the two brake circuits is limited by the volume of the two master-cylinder piston work chambers. Even if the power source is fully available no pressure increase can occur any longer in the brake circuits once the two master-cylinder pistons have covered their maximum possible travel. Such a case may happen, for instance, if air has entered into the brake circuits. The fact that the brake-fluid volume available in both brake circuits is very limited makes it impossible to install in the brake circuits a simple antiskid arrangement wherein brake fluid is withdrawn to reduce the pressure.

From U.S. Pat. No. 3,639,008, a brake system is known wherein the brake pedal activates both a master cylinder and a pressure-control valve through two separate tappets. Pressure fluid from a power source is supplied to the wheel brake cylinders by the pressure-control valve. Also, there is a connection between the pressure-control valve and the master cylinder. When the brake is applied, the pressure introduced by the pressure-control valve prevents movement of the master-cylinder piston. In this manner, the master-cylinder piston is at all times available for an emergency braking when the power source has failed.

Compared to the system DT-OS No. 2,045,803, the brake system known from U.S. Pat. No. 3,639,008 has the advantage that a sufficient amount of brake fluid is available at the wheel brake cylinders. However, the provision of two separate brake-actuating arrangements renders the system rather costly and complicated. It has also to be considered that two lines must lead to each brake. A defect in the connecting line between the wheel brake cylinders and the power source may make it impossible to operate the brake through the master cylinder. If it is desired to enlarge the system so that also in a dual-circuit brake system both circuits can be activated independently from one another through a master cylinder upon the failure of the power source, the expenditure therewith involved will be multiplied accordingly.

SUMMARY OF THE INVENTION

It is the object of the present invention to provide a brake system permitting the wheel cylinders to be actuated by pressure by means of both a power source and the pedal effort alone using but one brake unit for all brake circuits, wherein a large volume of brake fluid is available at the wheel brake cylinders and which is nevertheless simple and cheap.

A feature of the present invention is the provision of a dual-circuit brake system comprising: a master cylinder housing having a longitudinal axis; two master-cylinder pistons disposed in tandem relationship in the housing coaxial of the axis; a work chamber for each of the two master-cylinder pistons disposed in the housing, the work chambers being disposed at the end of its associated one of the master-cylinder pistons remote from a brake pedal; a pair of brake circuits, each of the brake circuits being connected to a different one of the work chambers; a power source; a pressure-control valve disposed in the housing coaxial of the axis between one of the master-cylinder pistons and the brake pedal connected to the power source, the pressure-control valve introducing pressurized fluid from the power source to the brake circuits, the pressure-control valve being capable of being displaced by the brake pedal to manually actuate the master-cylinder pistons if the power source fails; an annular chamber disposed between the outer surface of each of the master-cylinder pistons and the inner surface of the housing and between a sleeve seal disposed in the associated one of the work chambers engaging the inner surface of the housing and another seal close to the brake pedal between the outer surface of each of the master-cylinder pistons and the inner surface of the housing, each of the annular chambers being connected to the power source through the pressure-control valve; and a fluid connection between each of the work chambers and the associated one of the annular chambers provided by longitudinal bores spaced from the axis in the associated one of the master-cylinder pistons and past the outer periphery of the associated one of the sleeve seals.

In this way, the dual-circuit brake system constructed according to this invention is unlikely to become more complicated than the system disclosed in DT-OS 2,045,803. It offers the decisive advantage that a large amount of brake fluid is available for both brake circuits, the amount of brake fluid being merely limited by the size of the power source. Thus, the brake system will remain operative even if there are, for example, air pockets in the brake circuits. There is no problem in providing the brake system with an antiskid arrangement since the fluid volume available in the brake circuits is large enough to permit brake fluid to be withdrawn for reducing the brake pressure. In contrast to the brake system of U.S. Pat. No. 3,639,008, the inventive brake system enjoys the advantage of requiring but one single brake unit. In spite of the brake system being designed as a dual-circuit brake system, the constructional expenditure is comparatively low.

A particularly advantageous embodiment of the invention lies in that the master cylinder has two master-cylinder pistons of different diameter which are anchored to one another in the manner of a stepped master cylinder. This design is very advantageous where the power source fails. If the power source fails and both brake circuits are still operable, a pressure which is reduced compared to the full power pressure can be built up in both brake circuits in accordance with the pedal force applied by the vehicle operator. However, the inventive brake system being designed such that the designer is free to choose the diameters of the master-cylinder pistons in accordance with the pedal force available, it is possible to design the brake system in such a way that a sufficient braking effect can be achieved in both brake circuits using solely the brake pressure generated by the pedal effort.

Considering the case that not only the power source but also a brake circuit have failed, the embodiment incorporating a stepped master cylinder offers a surprising advantage. If one brake circuit fails, the pedal force is supplied only against the face of one master-cylinder piston. Thus, assuming that both master-cylinder pistons have the same size faces, the same amount of pedal effort permits a double brake pressure to be achieved compared to the operation of both brake circuits without the power source, if one circuit and the power source have failed. This provides a still sufficient braking effect with but one intact brake circuit and without the assistance of the power source.

A further advantageous embodiment of the invention is that the pressure-control valve has a control casing axially displaceable by the applied pressure in the direction of the master-cylinder pistons against a simulator spring, the casing having an extension resting against the master-cylinder piston closest to the brake pedal, wherein the actuating surface of the control casing in the direction of the master-cylinder piston is larger than the actuation surfaces of both master-cylinder pistons acting in the direction of the brake pedal.

From this design results the advantage that the control casing moves against the force of the simulator spring whenever the brake is applied. This produces a sufficient pedal travel even if the brake system is activated by the power source, which is beneficial to a brake "feel" as it may be termed. It is achieved further that the master-cylinder pistons are moved whenever the brake is applied. This causes the master-cylinder pistons to build up pressure in both brake circuits before pressure from the power source is introduced by the pressure-control valve into the work chambers of the dual-circuit brake system via the annular chambers. This offers the advantage that the driver is able to sense a defect of the sleeve seals by an increase in the brake-pedal travel. Air in the work chambers of the master cylinder will make itself felt in the same way. If the master-cylinder pistons never moved during brake application, it could happen that defect sleeve seals or air pockets would make it impossible to operate the brake through the master-cylinder pistons. The driver would become aware of this only upon the failure of the power source, because the supply of pressure fluid from the power source made it possible before the failure occurred to achieve a normal braking.

The force of the simulator spring may be adapted relative to the actuation surface of the control casing such that both brake circuits are essentially charged with fluid from the power source and that the master-cylinder pistons are only slightly displaced.

A further advantageous embodiment of the invention is that the simulator spring bears against a piston axially displaceable on an extension of the control casing, with this piston being held against a stop fixedly mounted on the control casing by the action of the pressure applied, and having an actuation surface which is larger than the control casing. This design permits the simulator spring to be displaced without any effort when the power source has failed so that the force of the simulator spring need not be overcome for applying the brake. By virtue of the fact that the control casing can be moved with its extension directly against the master-cylinder piston closest to the brake pedal, no loss of travel will occur at the brake pedal when the brake system is activated without the assistance of the power source.

A still further embodiment of the invention is that a stepped piston is interposed in the connection between the annular chambers of the master-cylinder pistons and the pressure-control valve. This arrangement permits the operation of the dual-circuit brake system using a low-pressure power source. For example, the pressure generated by a steering pump may be made use of. Further, it is possible to use different fluids, one for the power source and the pressure-control valve, the other for the actual brake system.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
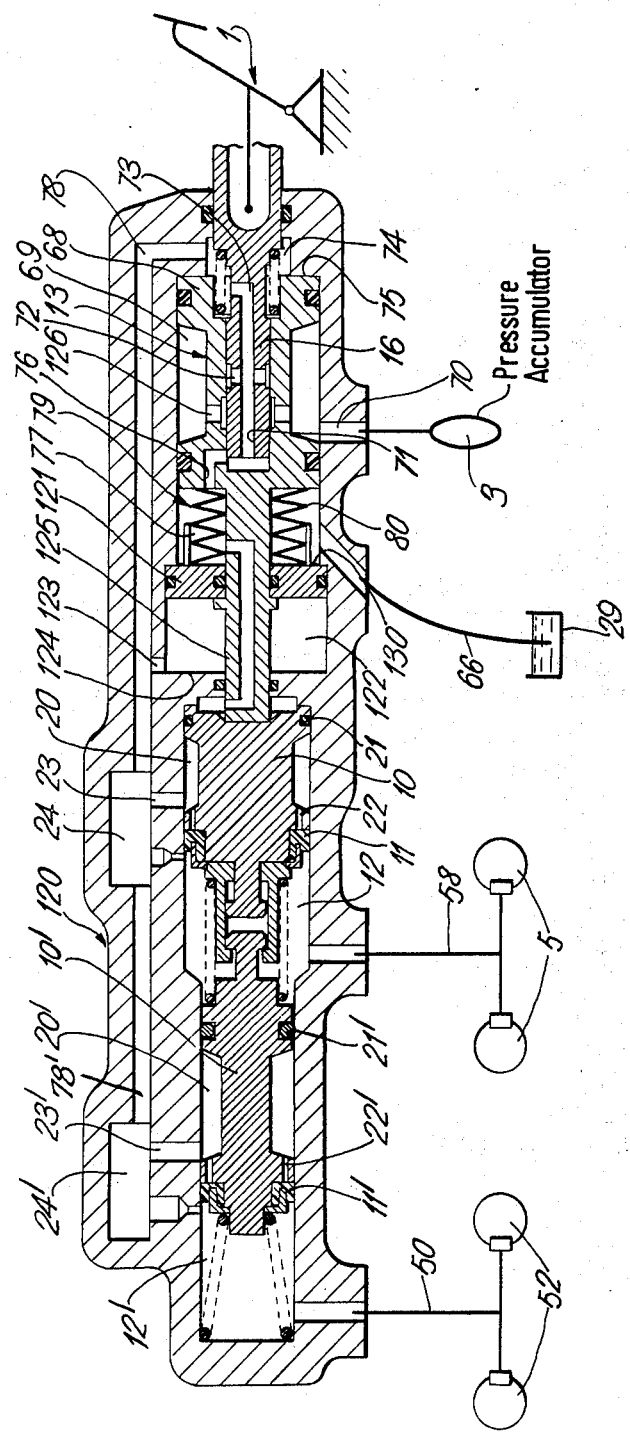
FIG. 1 is a longitudinal cross-sectional view of one embodiment of the dual-circuit master cylinder in accordance with the principles of the present invention.

FIG. 1 shows a brake unit which is actuatable by a brake pedal 1. In essence, the brake unit includes a pressure-control valve 13 and a master cylinder 120 having master-cylinder pistons 10 and 10'. The master-cylinder pistons 10 and 10' urge brake fluid out of work chambers 12 and 12' via brake lines 58 and 50 into wheel brake cylinders 52 and 5 of automotive vehicle brakes. The power source is a pressure accumulator 3.

The pressure-control valve 13 shall first be described in more detail. Valve 13 controls the flow of pressure fluid from power source 3 into wheel brake cylinders 52 and 5 when the brake pedal 1 is depressed. Pressure-control valve 13 includes a control casing 68 which is axially displaceable in the brake unit and in a sealed relation with the inner surface of the housing of master cylinder 120. The control casing 68 has an annular chamber 69 permanently communicating with power source 3 via a bore 70. Axially displaceable in control casing 68 is a valve spool 16 permanently connected with brake pedal 1. Valve spool 16 has a longitudinal bore 71 and cross or transverse bores 72 and 73. The longitudinal bore 71 provides a connection between a chamber 77 and a chamber 74 via a channel 76, chamber 74 being disposed between a pedal-side front wall 75 of control casing 68 and the pedal-side end plate of the brake unit. Chamber 77 is in constant communication with an unpressurized reservoir 29 through a conduit 66. The cross bores 72 and 73 in valve spool 16 are so designed that the connection between the two chambers 74 and 77 will first be interrupted when valve spool 16 is displaced in the actuating direction. Pressure fluid is then allowed to flow from annular chamber 69 into chamber 74 via a bore 126, cross bore 72 and longitudinal bore 71.

From chamber 74, a longitudinal channel 78 leads to a compensating reservoir 24 and to a further compensating reservoir 24'.

With regards to master cylinder 120 which shall now be explained in greater detail, it includes, as has already been mentioned, two master-cylinder pistons 10 and 10' having different diameters. The master-cylinder piston 10 which has the larger diameter is closest to brake pedal 1. As is conventional practice in stepped master cylinders, the two master-cylinder pistons 10 and 10' are anchored to one another. The anchoring permits the two master-cylinder pistons 10 and 10' to make limited movements towards or away from one another. The anchoring itself is known in the art. For example, one embodiment is described in U.S. Pat. No. 3,488,959.

Each of the two master-cylinder pistons 10 and 10' has a respective annular chamber 20 and 20' disposed between a respective sleeve seal 11 and 11' and a respective seal 21 and 21' closest to the brake pedal. From each of said annular chambers, respective compensating bores 23 and 23' lead to the compensating reservoirs 24 and 24'.

Finally, a travel simulator 79 shall be described which is interposed between pressure-control valve 13 and master cylinder 120. Travel simulator 79 includes a simulator spring 80 bearing with one end against control casing 68 and with the other end bearing against a supporting piston 121. Supporting piston 121 is disposed in a pressure chamber 122 communicating with longitudinal channel 78 via an opening 123. In the direction of brake pedal 1, the pressure chamber 122 has a stop 130 formed in the housing of the brake unit, against which stop the supporting piston 121 is held by virtue of the pressure in chamber 122, because chamber 77 is always at reservoir pressure. The pressure chamber 122 is separated from the master cylinder 120 by a wall 124. Extending through wall 124 and through supporting piston 121 is an extension 125 of control casing 68. Extension 125 is in a sealed relation with supporting piston 121 and is axially slidable both in supporting piston 121 and in the wall 124. Extension 125 rests firmly against master-cylinder piston 10, thereby causing the latter to be equally displaced when control casing 68 is displaced against the force of simulator spring 80.

The dual-circuit brake system operates as follows: The drawing shows the brake unit in its inoperative position. The chamber 74 communicates with chamber 77 and thus with unpressurized reservoir 29 via cross bore 73, longitudinal bore 71 and channel 76. Compensating reservoirs 24 and 24' are not pressurized since they communicate with chamber 74 via longitudinal channel 78. When brake pedal 1 is depressed, valve spool 16 will move in control casing 68, thereby first closing channel 76 so that the connection provided by longitudinal bore 71 between chamber 74 and unpressurized chamber 77 which communicates with unpressurized reservoir 29 is interrupted. Upon further displacement of valve spool 16 in the operating direction, cross bore 72 will overlap control bore 126 so that pressure fluid will be allowed to flow from the annular chamber 69 into chamber 74 via control bore 126, cross bore 72 and longitudinal bore 71 and, hence, into compensating reservoirs 24 and 24' via longitudinal channels 78 and 78'. From compensating reservoirs 24 and 24', pressure fluid will flow into the annular chambers 20 and 20' via compensating bores 23 and 23'.

At the same time, the pressure in chamber 74 displaces the control casing 68 to the left, as viewed in the drawing, against the force of the simulator spring 80. This causes extension 125 to displace master-cylinder piston 10 and thereby master-cylinder piston 10' in the actuating direction. Pressure will build up in each of the work chambers 12 and 12' of master-cylinder pistons 10 and 10', the pressure resulting from the surface of control casing 68, force of simulator spring 80, and the end faces of master-cylinder pistons 10 and 10'. Only when the brake pedal has been depressed far enough to build up pressure in the compensating reservoirs 24 and 24' and consequently in the annular chambers 20 and 20', the pressure being higher than the one in the work chambers 12 and 12', will pressure fluid be introduced from the annular chambers 20 and 20', through the longitudinal bores 22 and 22' and past the outer periphery of sleeve seals 11 and 11' into the respective work chambers 12 and 12'.

It results from the above features that control casing 68 is supported by simulator 79 and by the pressure prevailing in the two work chambers 12 and 12'. For example, if the pressure building up in the work chambers 12 and 12' is delayed due to air pockets, control casing 68 will be displaced in the brake-applying direction. The driver will become aware of such air pockets by having to depress the pedal farther than usual.

It shall now be assumed that power source 3 has failed and that the driver has to operate the brake solely by his pedal effort. Since pressure chamber 122 is unpressurized, supporting piston 121 may be readily displaced in the operating direction, together with extension 125. Thus, travel simulator 79 offers no resistance to the brake application upon the failure of power source 3. Via extension 125, master-cylinder piston 10 will be mechanically shifted so that pressure will build up in both work chambers 12 and 12' as in a normal stepped master cylinder. Since the pedal effort is smaller than the force generated by power source 3, the pressure available in the two work chambers 12 and 12' will naturally be less than when use is made of the power source for brake application. The diameters of the master-cylinder pistons 10 and 10' may, however, be designed such that sufficient brake pressure can also be generated without the assistance of the power source.

If both the power source and a brake circuit have failed, the pedal force will bear against only one master-cylinder piston 10 or 10' through the brake pedal 1, control casing 68 and extension 125. This permits a higher brake pressure to be achieved in the intact brake circuit using the same effort so that a sufficient braking effect can still be achieved even if only one brake circuit is operative.

Figure 2:
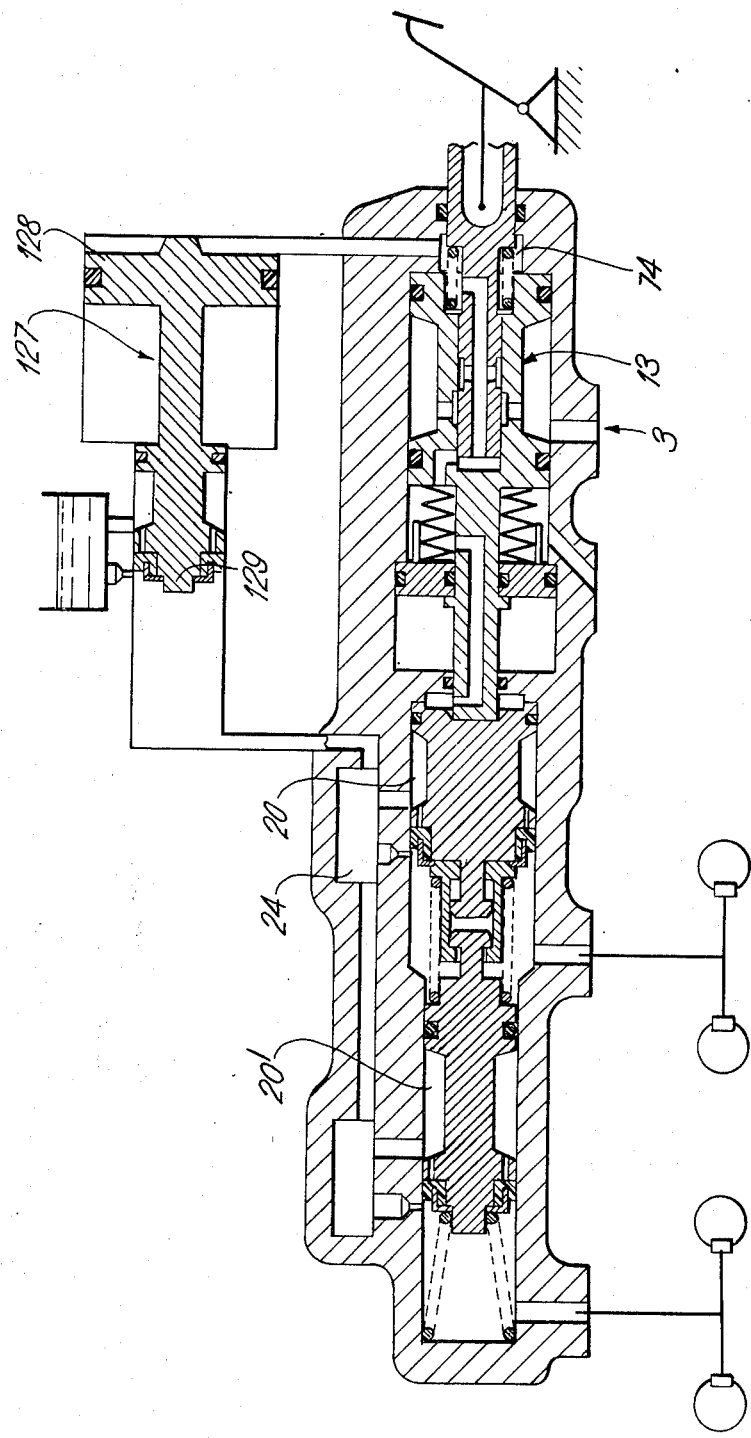
FIG. 2 is a longitudinal cross-sectional view of another embodiment of the dual-circuit master cylinder in accordance with the principles of the present invention.

Referring now to FIG. 2, the second embodiment shall be explained. The brake unit of FIG. 2 differs from that of FIG. 1 in that a stepped piston 127 is interposed in the connection between annular chambers 20 and 20', respectively, and pressure-control valve 13. In this embodiment, stepped piston 127 is provided between chamber 74 and compensating reservoir 24. On the inlet side, stepped piston 127 has a large actuating surface 128, and on the side adjacent compensating reservoir 24, a small actuation surface 129. This permits the use of a power source having a comparatively low pressure. Namely, the pressure introduced into chamber 74 by pressure-control valve 13 is increased by stepped piston 127 in the ratio of the actuating surfaces 128 and 129. In this manner, the steering pump of an automotive vehicle may, for instance, be used as power source 3.

While I have described above the principles of my invention in connection with specific apparatus it is to be clearly understood that this description is made only by way of example and not as a limitation to the scope of my invention as set forth in the objects thereof and in the accompanying claims.

I claim:

1. A dual-circuit brake system comprising:
a master cylinder housing having a longitudinal axis;
two master-cylinder pistons disposed in tandem relationship in said housing coaxial of said axis;
a work chamber for each of said two master-cylinder pistons disposed in said housing, said work chambers being disposed at the end of its associated one of said master-cylinder pistons remote from a brake pedal;
a pair of brake circuits, each of said brake circuits being connected to a different one of said work chambers;
a power source capable of producing a pressurized fluid;
a pressure-control valve disposed in said housing coaxial of said axis between one of said master-cylinder pistons and said brake pedal connected to said power source, said pressure-control valve introducing said pressurized fluid from said power source into said brake circuits, said pressure-control valve being capable of being displaced by said brake pedal to manually actuate said master-cylinder pistons if said power source fails;
an annular chamber disposed between the outer surface of each of said master-cylinder pistons and the inner surface of said housing and between a sleeve seal disposed in the associated one of said work chambers engaging the inner surface of said housing and another seal close to said brake pedal between the outer surface of each of said master-cylinder pistons and the inner surface of said housing, each of said annular chambers being connected to said power source through said pressure-control valve; and
a fluid connection between each of said work chambers and the associated one of said annular chambers provided by longitudinal bores spaced from said axis in the associated one of said master-cylinder pistons and past the outer periphery of the associated one of said sleeve seals.

2. A system according to claim 1, wherein
said master-cylinder pistons each have a different diameter and are anchored one to the other.

3. A system according to claim 2, wherein
said pressure-control valve includes
a control casing disposed in said housing coaxial of said axis in an axially displaceable sealed relation with the inner surface of said housing, said control casing being displaced in the direction of said master-cylinder pistons by said pressurized fluid and having a bore therein coaxial of said axis,
a valve spool disposed in said bore actuated by said brake pedal,
an extension of said control casing resting against that one of said master-cylinder pistons closest to said brake pedal, and
a simulator spring disposed coaxially of said axis about said extension, said control casing being displaced against the force of said spring,
said control casing having an actuating surface adjacent said one of said master-cylinder pistons which is larger than the actuating surface of said master cylinder pistons remote from said brake pedal.

4. A system according to claim 3, further including
a supporting piston axially displaceable on said extension, said supporting piston being held, by the action of the pressurized fluid against a stop formed in the inner surface of said housing, said supporting piston having a larger actuating surface than said actuating surface of said control casing.

5. A system according to claim 4, wherein
said simulator spring is disposed between said supporting piston and said actuating surface of said control casing.

6. A system according to claim 5, further including
a stepped piston interposed in a connection between said annular chambers and said pressure-control valve.

7. A system according to claim 1, wherein
said pressure-control valve includes
a control casing disposed in said housing coaxial of said axis in an axially displaceable sealed relation with the inner surface of said housing, said control casing being displaced in the direction of said master-cylinder pistons by said pressurized fluid and having a bore therein coaxial of said axis,
a valve spool disposed in said bore actuated by said brake pedal,
an extension of said control casing resting against that one of said master-cylinder pistons closest to said brake pedal, and
a simulator spring disposed coaxially of said axis about said extension, said control casing being displaced against the force of said spring,
said control casing having an actuating surface adjacent said one of said master-cylinder pistons which is larger than the actuating surface of said master cylinder pistons remote from said brake pedal.

8. A system according to claim 7, further including
a supporting piston axially displaceable on said extension, said supporting piston being held, by the action of the pressurized fluid against a stop formed in the inner surface of said housing, said supporting piston having a larger actuating surface than said actuating surface of said control casing.

9. A system according to claim 8, wherein
said simulator spring is disposed between said supporting piston and said actuating surface of said control casing.

10. A system according to claim 9, further including
a stepped piston interposed in a connection between said annular chambers and said pressure-control valve.

11. A system according to claim 1, further including
a stepped piston interposed in a connection between said annular chambers and said pressure-control valve.

* * * * *